US006132681A

United States Patent [19]
Faran et al.

[11] Patent Number: 6,132,681
[45] Date of Patent: Oct. 17, 2000

[54] DISPOSABLE DOSIMETER FOR SUN RADIATION

[75] Inventors: Ori Faran; Ezra Natan, both of Haifa; Dmitry Lastochkin, Nesher, all of Israel

[73] Assignee: Skyrad Ltd., Haifa, Israel

[21] Appl. No.: 09/089,252

[22] Filed: Jun. 3, 1998

Related U.S. Application Data

[60] Provisional application No. 60/059,041, Sep. 16, 1997.

[51] Int. Cl.⁷ ........................................ G01J 1/38
[52] U.S. Cl. ............................ 422/58; 422/61; 250/482.1
[58] Field of Search .................... 422/58, 61; 250/474.1, 250/482.1

[56] References Cited

U.S. PATENT DOCUMENTS

| 3,787,687 | 1/1974 | Trumble . |
| 3,903,243 | 9/1975 | Atsukawa et al. . |
| 3,903,423 | 9/1975 | Zweig ...................................... 250/474 |
| 4,829,187 | 5/1989 | Tomita et al. . |
| 5,117,116 | 5/1992 | Bannard et al. . |
| 5,411,835 | 5/1995 | Brinser ..................................... 430/138 |
| 5,612,541 | 3/1997 | Hoffmann et al. ................... 250/474.1 |

*Primary Examiner*—Lyle A. Alexander
*Attorney, Agent, or Firm*—Blank Rome Comisky & McCauley LLP

[57] ABSTRACT

A disposable dosimeter for sun radiation comprising a matrix with at least one active chemical compound distributed therein, capable of changing its original color to a new color due to a chemical reaction induced by exposure to UV radiation, said matrix made of a material having transparency sufficient for visual detection the change of the original compound's color to the new color, said matrix containing at least one absorbing compound capable of absorbing the UV radiation, said active chemical compound being capable of changing its color after exposure to UV radiation with an efficacy corresponding to at least 1 MED, said UV radiation being accumulated during at least 15 minutes of exposure and said active chemical compound having a resistance to change the new color neither during exposure to temperatures up to 50° C., nor during exposure to visible light.

23 Claims, 8 Drawing Sheets fig. 1 fig. 2

Skyrad Ltd.

fig. 3

Skyrad Ltd.

fig 4a fig 4b fig 4c fig. 5a fig. 5b fig. 5c fig. 5d fig. 6a          fig. 6b          fig. 6c fig .7 fig .8 fig .9 fig .10

Skyrad Ltd.

fig. 11

X = OMe
    NMe$_2$ fig. 12 fig. 13 fig.14 fig.15 fig.16 fig.17

DISPOSABLE DOSIMETER FOR SUN RADIATION

This is a continuation-in-part of Provisional Application Serial No. 60/059,041, filed Sep. 16, 1997, the subject matter of which is incorporated by reference in its entirety.

FIELD OF THE INVENTION

The ultraviolet region (UV region) is a region of the electromagnetic spectrum adjacent to the low end of the visible spectrum. The UV region extends between 400–100 nm, and is divided into 3 sub regions: the UVA region (400–320 nm), the UVB region (320–280 nm), and the UVC region (280–100 nm).

Of the three regions, the exposing to radiation in the UVB region is considered to be the most dangerous to human beings, since it causes several types of the must common cancer in human beings, i.e. skin cancer. One of the types of this cancer, namely melanoma, is lethal. In addition to the above, exposure to radiation in the UVB region can cause skin aging and is also harmful to eyes.

Radiation in the UVA region mainly causes damage, such as photo-aging, to the skin. Radiation in the UVC region does not penetrate the ozone layer, which fortunately also blocks most of the radiation in the UVB and the UVA region.

In the last two decades the levels of UV radiation that reach the earth, have increased substantially due to the depletion of the ozone layer, caused by the release of various chemicals in the form of aerosols into the atmosphere.

In some parts of the world the level of UV radiation has increased by 30–50%. The consequence of this process is a substantial increase in the danger of exposure to the sun's radiation.

It is believed, for example, that every 1% increase in the level of UV radiation, corresponds to a 4% increase in the number of skin cancer cases. Indeed, according to medical statistics the number of skin cancer cases has increased by hundreds of percents in the last 20 years.

UV radiation induces biological effects depending on the particular wavelength of the radiation. It is known to evaluate total biological or hazard weighted irradiation by multiplying the spectral irradiation at each wavelength by the biological or hazard weighted factor and then summation results of the multiplying over all the wavelengths.

Biological or hazard factors are obtained from the so-called action spectrum according to *Environmental health criteria* 160 *"Ultraviolet radiation"* issued by the World Health Organization, Geneva, 1994. An action spectrum is a graph of the reciprocal of the radiant exposure required to produce the given harmful effect at each wavelength. All the data in such graphs are normalized to the datum at the must efficacious wavelength. By summation of the biologically effective irradiation over the exposure period, the biologically effective radiant exposure (efficacy in $J/m^2$) can be calculated.

The action spectrum graph for UV induced erythema was adopted worldwide by many organizations such as:

1. ACGIH (American Conference of Governmental Industrial Hygienists)
2. WHO (World Health Organization)
3. UNEP (United Nations Environment Program)
4. INIRC (International Non Ionizing Radiation Committee)

The action spectrum graph is a complex curve, obtained by statistical analysis of many research results establishing the minimum radiant exposure to the UV radiation at different wave lengths sufficient for causing erythema.

The most commonly used quantity of radiation associated with the erythemal potential due to exposure to UV radiation is the number of so-called minimum erythemal doses (MED) caused by the exposure. An MED is defined as the radiant exposure of the UV radiation that produces a just noticeable erythema on previously unexposed skin. The radiant exposure to monochromatic radiation at around 300 nm with the maximum spectral efficacy, which is required for erythema corresponds to approximately 200 to 2000 $J/m^2$ efficacy, depending on the skin type.

The skin reacts to radiation by changes in the melanin content. Subsequent to the change in the melanin content reddening occurs, and then soreness and signs of sun burning appear.

There exist 5 types of skin types which differ according to the color of human hair, eyes, and skin, and by their reaction to overexposure to UV radiation. The permissible time for exposure to UV radiation on a mid summer day changes from 15 minutes for skin type no.1, to about 2 hours for skin type no.5 (without using sun screen).

Most people are not aware of the danger that can arise even after limited exposure to UV radiation, because the dose is accumulated during the exposing for varying periods of time in a daily life routine. The first visible sign is usually sunburn, which might only become visible after a few hours. This means that the individual becomes aware of the danger only after the damage has already been done. It should be emphasized that skin cancer might even appear years later.

Unfortunately, most people routinely do not use sun screens unless they are on the beach or a trip. Even then people usually do not use means of protection before they become exposed to the sun's radiation, and do not repeat applying sunscreen during exposure to the sun.

UV radiation level changes continuously, because of latitude, air pollution, season of year, clouds, and other factors. Therefore, it is very difficult to give accurate, reliable and timely warnings to the public about the UV radiation levels for specific location and day time. The only practical means that the public can use to defend itself is a personal dosimeter.

There is known a dosimeter described in our previous U.S. provisional application 60/059,041. The dosimeter disclosed in this application comprises a polymeric matrix with embedded therein a photochromic compound capable of changing its original color after exposure to UV radiation with efficacy corresponding to at least 1 MED, which has accumulated during at least 15 minutes of exposure.

The compound polymer materials employed in this dosimeter are chosen so as to be capable of reversing the original color after being retained for several hours at room temperature in darkness. By virtue of this provision it is possible to use the dosimeter hundreds of times. On the other hand the requirement of reversibility without significant fatigue of the color change limits the range of available photochromic and polymeric compounds and thus renders the dosimeter relatively sophisticated and expensive.

The dosimeter of the present invention is suitable for use as a disposable item either by a large group of individuals during a short period of time (a day), or by young children or babies who are not frequently exposed to direct sun radiation.

There is a known-in-the-art disposable dosimeter for sun radiation as per Shiseido Co.'s U.S. Pat. No. 4,829,187. This dosimeter employs a photo sensitive composition consisting of a discoloring agent, a photo activator and a UV-ray absorber. The photo activator forms free radicals by the irradiation of UV rays and the discoloring agent exhibits a color change in the visible region of a spectrum through the action of free radicals and a UV-ray absorber. The disadvantage of this dosimeter is associated with the fact that its principle of operation, and therefore the compound employed therein, is neither suitable to measure the radiation dose which is equivalent to an MED, nor is it selective to different types of the user's skin. The known dosimeter is designed in such a manner, that the amount of UV-radiation necessary for inducing the color change can be 1–100 J/cm$^2$. These values are far away from the magnitude of UV-radiation corresponding to an MED, which is about 20 mJ/cm$^2$ for skin type no.2.

Also known is a method and device for monitoring UV radiation as disclosed in Cybrandian Ltd.'s U.S. Pat. No. 5,117,116. In the specification of this patent it is mentioned that to facilitate quantifying the minimum dose of UV radiation an individual can tolerate, the dose of UV radiation which induces reddening in the skin is referred to as the Minimum Erythemal Dose. This dosimeter employs a chemical compound capable of changing its color on being subjected to UV radiation reflected from the skin of the user. The principal disadvantage of this provision is associated with the fact that various types of skin in various conditions reflect differently and therefore cause enormous uncertainty in the determining of the actual dose of UV radiation to which the skin of an individual has been subjected irrespective of whether this dose is attributed as an MED or not. Furthermore, there is no mention in the specification of the above patent how the outside temperature might influence the performance of the chemical compound. Since for monitoring reflected radiation the dosimeter should be provided with a dedicated support means capable of directing the reflected radiation upon the chemical compound the dosimeter's construction is complicated and inconvenient to use.

There is known a sunburn dosimeter as disclosed in American Cyanamid Co.'s U.S. Pat. No. 3,903,243. The principle of operation of this dosimeter is based on comparing the color change of a test area bearing chemical compounds capable of changing their color depending on the cumulative exposure to UV radiation with a standard area. The standard area bears a chemical compound which changed its color after exposure to different predetermined quantities of sunburn radiation. Unfortunately, the chemical compounds employed in this dosimeter are not chosen depending on their sensibility to a radiation, the amount of which is equal to an MED. These compounds are chosen depending on their capability for coloration after exposure to radiation referred to arbitrary time units and assuming that there exists a linear relationship between the ultimate time of exposure and the skin type. This assumption is not correct from the medical point of view. It should also be mentioned that comparison of a test area with a standard area is inevitably subjective and therefore renders the dosimeter less accurate.

Furthermore, there is known an ultraviolet radiation dosimeter as per Trumble's U.S. Pat. No. 3,787,687. The principle of operation of this dosimeter is similar to the previously mentioned dosimeter and is based on the comparison of a standard color chart with the color of a chemical compound exposed to UV radiation. The chemical compounds employed in this dosimeter are not chosen deliberately depending on their sensitivity to an MED of radiation or to skin type.

Thus, one can see that despite the existence of various UV radiation dosimeters there is still a need for a new, convenient, accurate and safe dosimeter which is both capable of giving timely and unequivocal warning to the user about the amount of sun radiation to which he has been exposed and which can be used by individuals with different skin types.

SUMMARY OF THE INVENTION

The main aim of the present invention is to provide for a new and improved disposable dosimeter, which is simple, cheap, convenient and is suitable for short use both by groups of individuals or for individual use.

A further object of the present invention is to provide for a disposable dosimeter employing active photochromic or photosensitive compound which changes its color irreversibly with an efficacy of at least 1 MED, after exposure to the sun's radiation.

Another object of the present invention is to provide for a disposable dosimeter which is equally suitable for use by individuals with different types of skin.

Still a further object of the invention is to provide for a dosimeter formed as a disposable sticker or a badge, which can be conveniently worn either by adults or by small children who are incapable of using more sophisticated dosimeters, or when a danger exists which might inadvertently damage the dosimeter.

In contrast to the known in the art dosimeters the new dosimeter is not based on the procedure of comparing with a reference chart.

The present dosimeter advises the user to terminate exposure to the sun's radiation after the whole dosimeter's surface has changed its initial color to the color that appears at the border of the surface. This coloration signifies that the user has already been exposed to 1 MED radiation.

BRIEF DESCRIPTION OF THE DRAWINGS

The graph refers to skin type No.2 and corresponds to 1 MED monochromatic radiation with wavelength 297 nm.

DETAILED DESCRIPTION OF THE PREFERRED EMBODIMENTS

Since the device in accordance with the present invention functions as a dosimeter and not as a detector, it is very important that it be attached to the user's clothing or equipment in such a manner that it absorbs the same amount of sun radiation as that to which the user is exposed.

Figure 1:
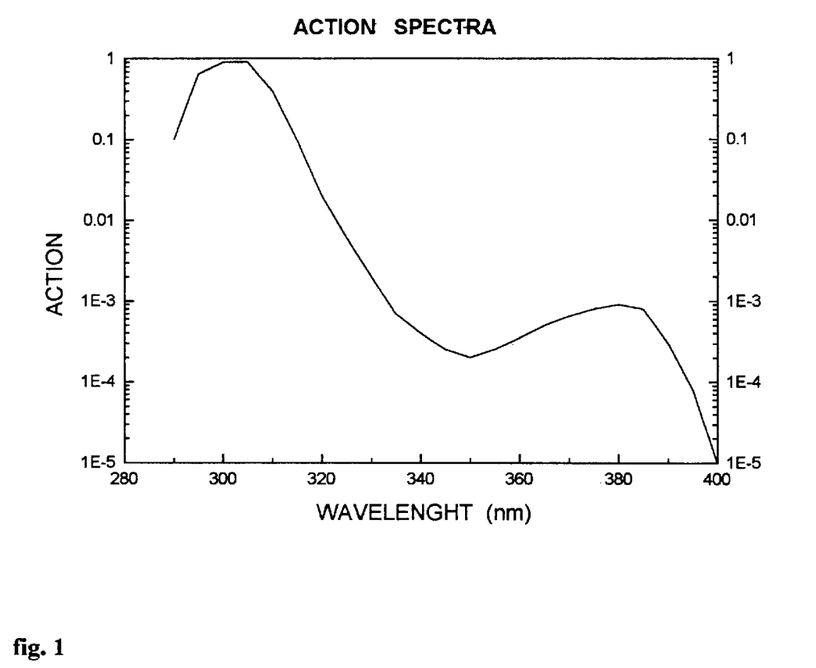
FIG. 1 shows example of an action spectra graph.

The specific photochromic or photosensitive substances employed in the dosimeter of the present invention are selected in such a manner that they are sensitive to exposure to solar radiation in the UV region, but not necessarily at the wavelengths which corresponds to the peak of action spectrum as shown in FIG. 1, because this wavelength band (around 300 nm) is beyond the visible spectrum in which it is desirable that the color change take place.

On the other hand the desirable wavelength band in which the photochromic compound changes its color should not be too far from the wavelength corresponding to the action spectrum peak. This is required in order to eliminate possible mistakes associated with the extrapolation from the wavelength at which a particular photochromic or photosensitive compound changes its color to the wavelength corresponding to the action spectrum peak.

Figure 3:
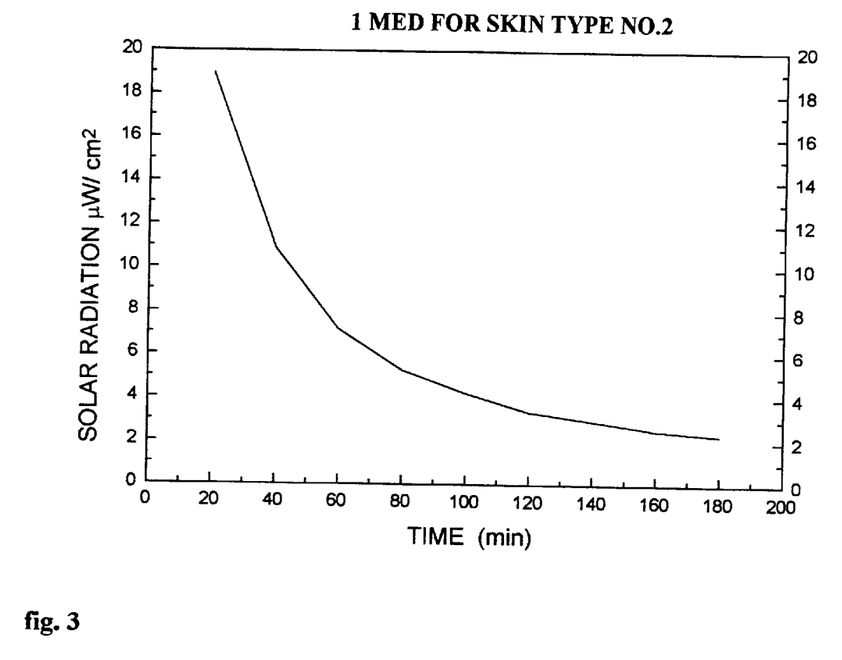
FIG. 3 is a graphic illustration of solar radiation efficacy as a function of time.

The amount of UV radiation that can present a danger to an individual exposed to the sun's radiation is determined on the basis of existing action spectra and available data for each skin type. An average integral of the intensity of radiation vs. time is calculated from the MED efficacy-time dependence available for monochromatic radiation of 297 nm. An example of this dependency referring to skin type No.2 is shown in FIG. 3.

Figure 2:
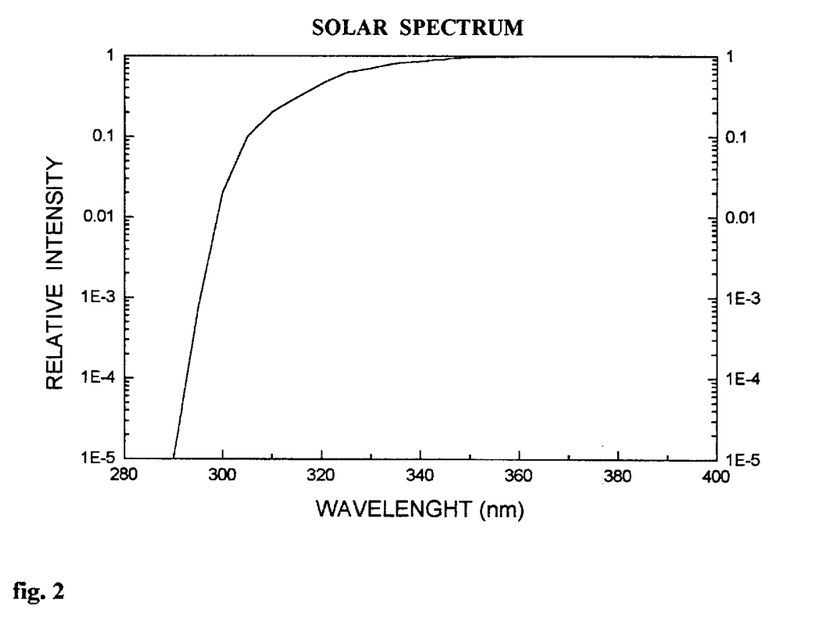
FIG. 2 shows the relative intensity of UV solar radiation versus wavelength.

The effective intensity of irradiation at a particular wavelength or band, to which the employed photochromic or photosensitive compound is sensitive is determined from the dependence of UV radiation intensity vs. wavelength. The example of this function is shown in FIG. 2. This intensity is then extrapolated to the intensity of an irradiation taking place at 297 nm and at the conditions to which the user will be exposed.

The color change is effected by exposing the dosimeter to a radiation dose produced by a sun simulator (type 16S, manufactured by Solar Light co.), capable of emitting up to 20 times the sun radiation intensity in the UV region.

The simulator is provided with a radiation dose control means that allows to set the radiation in $J/m^2$ to the desired dose in MED. For this purpose individual samples of photochromic compounds are distributed on the surface of 1 square cm and subjected to high intensity radiation so as to induce change of color. Afterwards the samples are subjected to the sun's radiation. The irreversibility of color and the influence of ambient temperature are tested both in the UV region and in full spectrum of the sun's radiation.

Figure 4A:
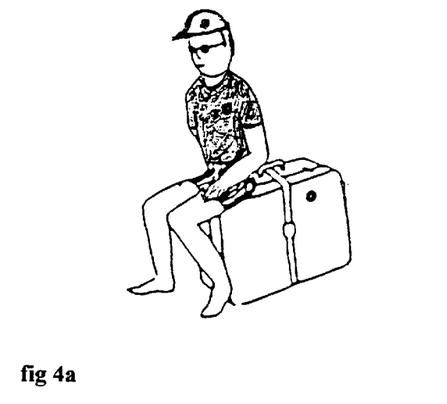
FIGS. 4a,b,c show how a new dosimeter can be worn by a user or on a equipment.
Figure 4B:
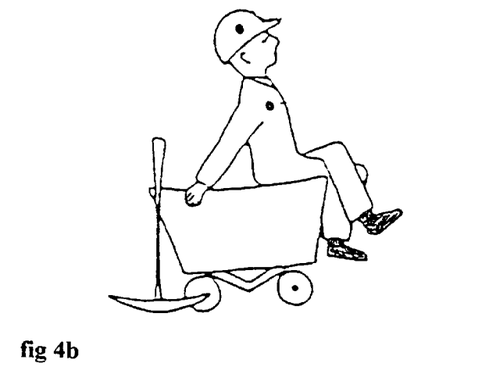
Figure 4C:
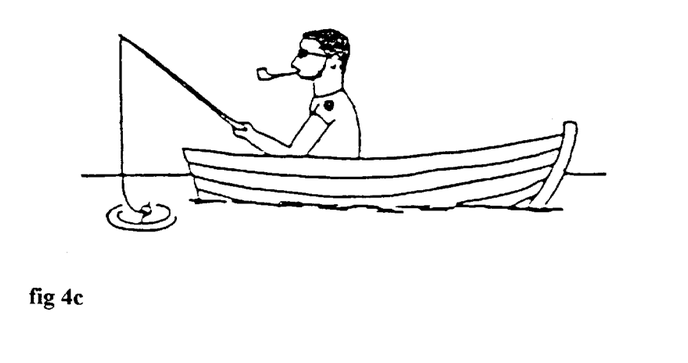

With reference to FIGS. 4a,b,c it is shown how the new dosimeter as disposable sticker, for example, can be attached to the user's clothing, equipment etc.

The particular combination of an active chemical compound and an absorber and material of the matrix for use in the dosimeter is chosen in such a manner that the dosimeter changes color during exposure to solar radiation, the efficacy of which exceeded the individual's permissible MED corresponding to his personal skin type. Provided in accordance with the invention are 5 types of dosimeters which can be distributed alone or in combination, each of them capable of responding to solar radiation, the particular efficacy of which in MED is defined as ultimate for a particular skin type. By virtue of this provision the user can choose the dosimeter which is safest for him and thus avoid damage to his skin and/or his eyes.

Since the new dosimeter operates continuously irrespective of whether it is exposed either to direct or reflected sun radiation it can be appreciated that the dosimeter does not affect the user's daily activities. By virtue of this provision the public's attitude to use such a dosimeter will be more positive and thus there will also be increased awareness of the danger of exposure to UV radiation.

The user can also use the dosimeter simultaneously with a sun screen by applying it to the dosimeter surface, and thus increase the permissible time of exposure to the sun's radiation.

With reference to FIGS. 5a–d the construction of the dosimeter will now be explained. The dosimeter comprises a polymeric matrix 2 with a layer 4 attached thereto. This layer is made of a sticky material, for example, glue or scotch and by virtue of this provision the dosimeter can be attached to the user's clothing or equipment as shown in FIGS. 4a–c. The aim of the matrix is to carry an active chemical compound therein, to reliably protect it from corrosion due to ambient humidity and to thereto impart machinability. The matrix material should be thermally stable, i.e., should not alter its opaqueness after heating up to 50 degrees C. so as to retain its transparency sufficient for visualizing the variation of color of an active compound incorporated in the matrix. As an example of a suitable matrix material one can use various optically transparent materials, for example polycarbonates, polystyrenes, polyolifines, polyacrylates such as polymethylmethacrylates, polyvinyl derivatives, polyesther derivatives, polyvinyl chloride; cellulose derivatives such as cellulose acetate, polyurethanes, polyethylene terephthalate; silicone resins such as LSR (liquid silicone rubber), triethylene glycole dimethacrylate (TEGDM, commercially known as CR-39), epoxys etc. Transparent copolymers and blends of dissimilar transparent polymers are also suitable as a matrix material. Within the matrix an active photochromic or photosensitive compound 6 is distributed, preferably in combination with a UV absorbing material 8. The principle of choosing of the active compound in accordance with the present invention will be explained further. The UV absorber consists of a material that is capable of partially absorbing the UV radiation. By virtue of this provision it becomes possible to control the amount of accumulated radiation to which the active compound is exposed. Examples of materials suitable for use as absorbers include:

2,4-bis(2,4-dimethylphenyl)-6-(2-hydroxy-4-n-octyl-oxyphenyl)-1,3,5-triazine, 2-hydroxy-4-(N-octoxy)benzophenone, 2-(2H-benzotriazol-2-YL)-4,6-ditertpentylphenol, or 2,2'-dihydroxy-4-methoxybenzophenone.

In practice the total thickness of the matrix layer lies between 0.1–2.5 mm.

The active compound and absorbing material can be incorporated within the matrix by means of any known-inthe-art suitable method, for example by molding or casting. In practice the amount of an active compound or absorbing material within the matrix varies between 1 to 20 weight percent depending on the matrix material, type of an active compound and particular type of the user's skin. The matrix is coated by a thin layer of an opaque foil 10, which protects the active compound from premature exposure before the dosimeter is put in use. The foil can be easily peeled off before the dosimeter is put into use.

Figure 5A:
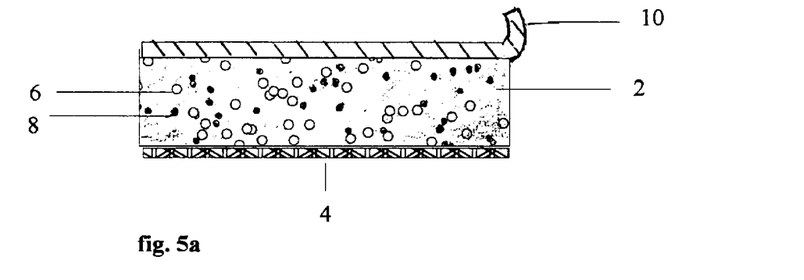
FIGS. 5a–5d show various constructions of the dosimeter

FIG. 5a a shows an embodiment of the present invention in which the active compound and absorbing material are homogeneously distributed within the matrix.

Figure 5B:
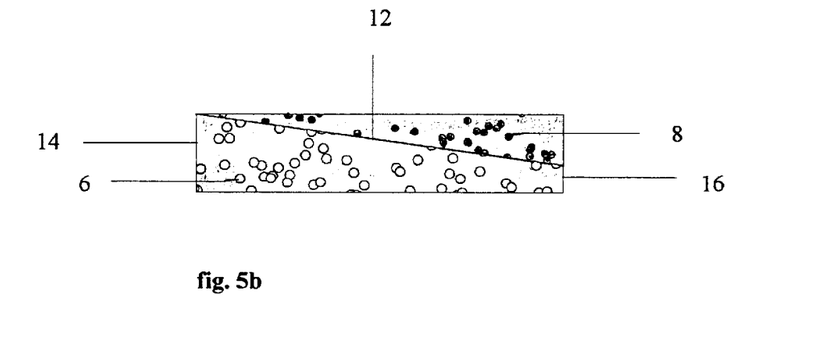
Figure 6A:
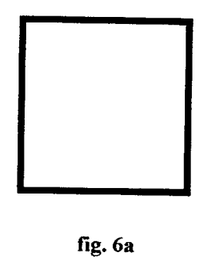
FIGS. 6a–6c schematically show the dynamic output (change of color) of the dosimeter as function of the increasing radiation dose received by the dosimeter.
Figure 6B:
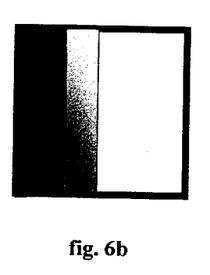
Figure 6C:
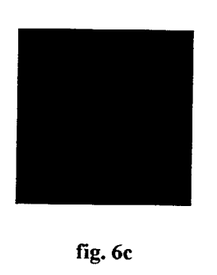

FIG. 5b shows an alternative embodiment of the dosimeter in which the active compound is distributed in one part of the matrix, while the absorbing material is distributed in the other part thereof and there is provided a border line 12 separating there between. The direction and slope of this border is deliberately chosen so as to create a gradient of thickness of the layer containing the absorber, i.e. a minimum thickness thereof at one side 14 of the dosimeter, which gradually increases to a maximum thickness thereof at the opposite side 16 of the dosimeter. It can be appreciated that the effective concentration of the active compound also varies along the same border line 12 from being correspondingly at its maximum at the side 14 and at its minimum at the opposite side 16. By virtue of this provision it is possible to control the amount of radiation accumulated by the active compound residing in different locations within the matrix and thus to achieve dynamic response of the active compound to the radiation dose the user has been exposed to. Referring now to FIGS. 6a–c it can be seen that by virtue of the gradient of absorber concentration, the coloration of the active compounds takes place not simultaneously over the whole surface of the dosimeter, but initiates at the side 14 and then gradually expands towards the opposite side 16 as shown in FIG. 6b until the entire surface of the dosimeter changes its color as shown in FIG. 6c. It can be advantageous to add to the polymeric matrix a dye or an organic pigment in order to impart suitable initial color to the dosimeter surface which could strengthen the contrast with the color of the active material after it has been exposed to the UV radiation. The classes of the organic pigments suitable for this purpose comprise Phtalocyanine, Quinacridone, Isoindolinone, Perylene, Anthraquinone, etc.

It can readily be appreciated that by the variation of thickness of the layer containing the UV absorbing material it is possible to render the dosimeter employing the same active compound suitable for users having different skin types.

Figure 5C:
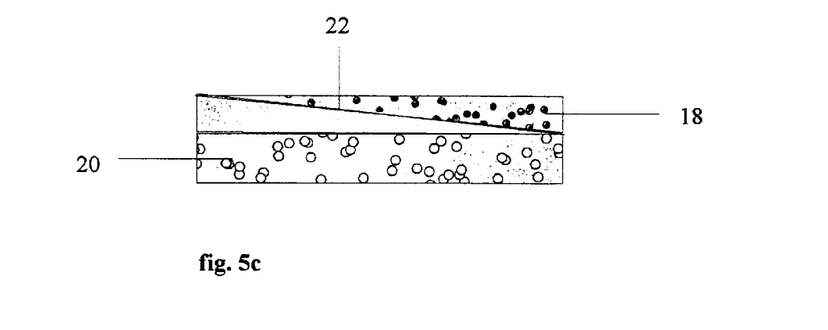
Figure 5D:
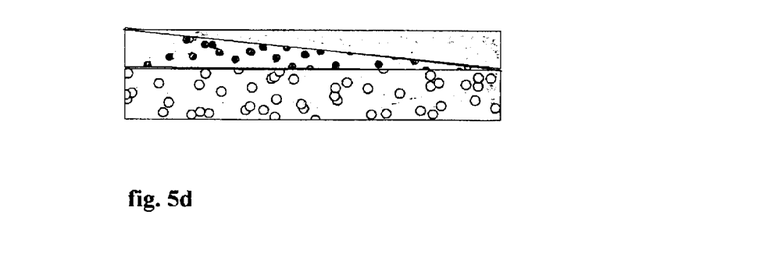

FIGS. 5c–d show two additional embodiments of the dosimeter in which the thickness of the absorber containing layer varies.

In FIG. 5c the active compound is distributed in the lower portion 18 of the matrix and its concentration is homogeneous. Within the upper portion 20 of the matrix is distributed the absorbing material and there is deliberately created a gradient of thickness of this portion and thus of the effective concentration of the absorber along a border line 22. One can see that at the left side of dosimeter the active compound is separated from the upper surface exposed to UV radiation only by the transparent matrix, while at the opposite side it is separated from this surface by the matrix with the absorber distributed therein. The lower and upper layers of the matrix can be made of similar or dissimilar material and thus, one can provide even better control of the dynamic response of the active compound to the UV radiation.

FIG. 5d shows the embodiment similar to that shown in FIG. 5c while the gradient of thickness of the abosrber containing matrix is arranged in such a manner that at the left side of the dosimeter the active compound is separated from the upper surface by the matrix with absorber and at the opposite side the active compound is separated from the upper surface solely by the matrix.

Having explained the construction of the new dosimeter it will now be explained in more detail how the chemical compounds employed therein are chosen. It has been empirically established that those photochromic or photosensitive compounds which satisfy the following criteria can be advantageously employed in the dosimeter according to the present invention:

1. The active compound should be capable of undergoing photochemical reactions accompanied by coloration in response to cumulative UV radiation of which the efficacy corresponds to at least 1 MED. The photochemical reaction should be accompanied by relatively slow change in the compound's color taking place during at least 15 min (for skin type No. 1) and no longer than during several hours (for skin type No.5).

2. The compound's color should be irreversible in the sense that it should not change or reverse its color after it has been exposed to the sun radiation. The irreversibility of color should remain irrespective of whether the dosimeter was exposed to visible sun radiation, held in darkness (for at least 4 hours), or exposed to temperatures up to 50 degrees C.

3. The mechanism of photochemical reaction responsible for coloration of the active compound should be at least one mechanism chosen from the group including tautomer hydrogen transfer, radical dissociation, photocleavage, or formation of ions.

Some non exhaustive representative examples of active photochromic compounds and photosensitive compounds which satisfy the above criteria are listed below:

a) Aromatic o-Nitro derivatives for example as described in Margerum, J. D.; Miller, L. J.; Saito, E.; Mosher, H. S.; Brown, M.; Hardwick, R. *J. Phys. Chem.*, 66, 2434 (1962) or in. Sousa, J. A.; Weinstein, J. *J. Org. Chem.*, 27, 3155 (1962) or in Bluhm, A. L.; Weinstein, J.; Sousa, J. A. *J. Org. Chem.*, 28, 1989 (1963).

Figure 7:
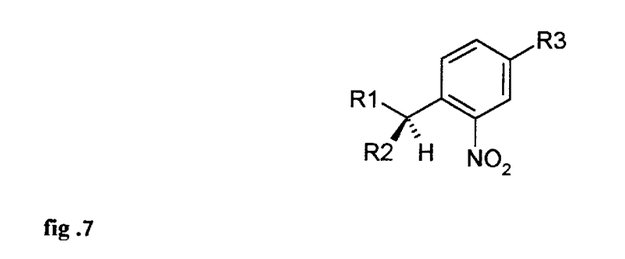
FIGS. 7–8 show the general chemical formulae of Aromatic o-Nitro derivatives and a specific example suitable for use in the present invention.
Figure 8:
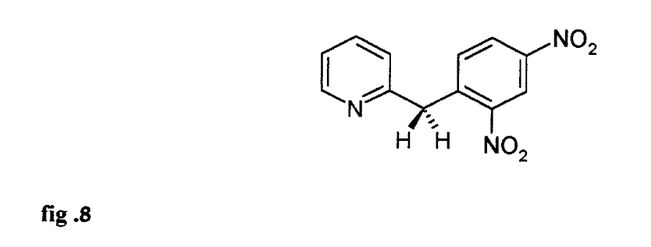
Figure 9:
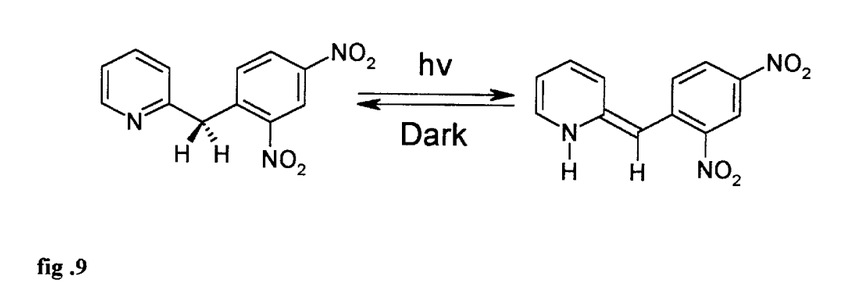
FIG. 9 shows the reaction of photochemical dissociation of the specific 2-(2',4'-dinitrobenzyl)pyridine (tautomer hydrogen transfer mechanism).
Figure 10:
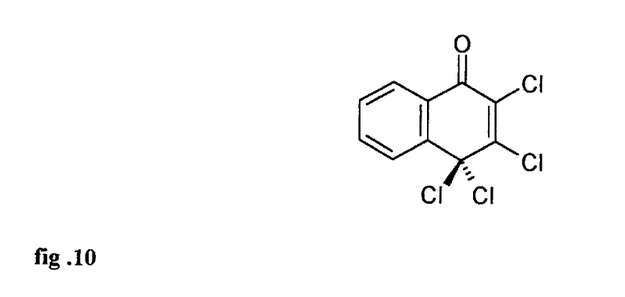
FIG. 10 shows the chemical formula of one of the photochromic substances suitable for use in the present invention (2,3,4,4-tetrachloro-1-oxo-1,4-dihydronaphthalene, TKN)
Figure 11:
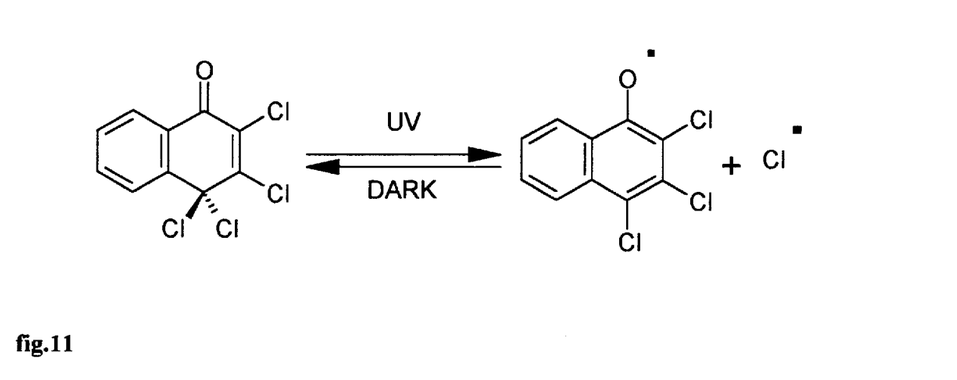
FIG. 11 shows the reaction of photochemical dissociation of the substance shown in FIG. 10 (radical mechanism).
Figure 12:
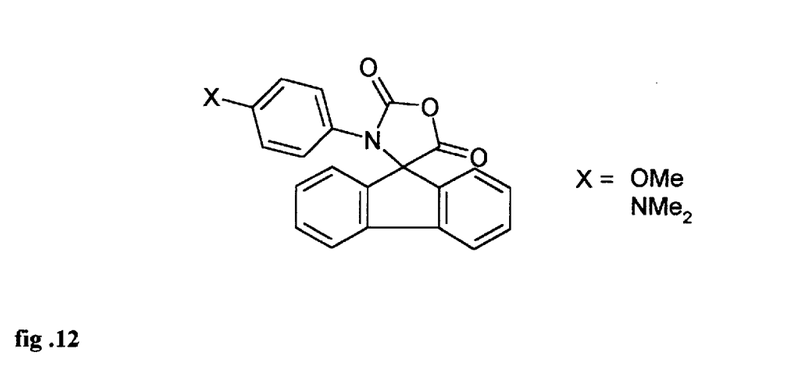
FIG. 12 shows the chemical formula referring to a group of photosensitive substances suitable for use in the present invention.
Figure 13:
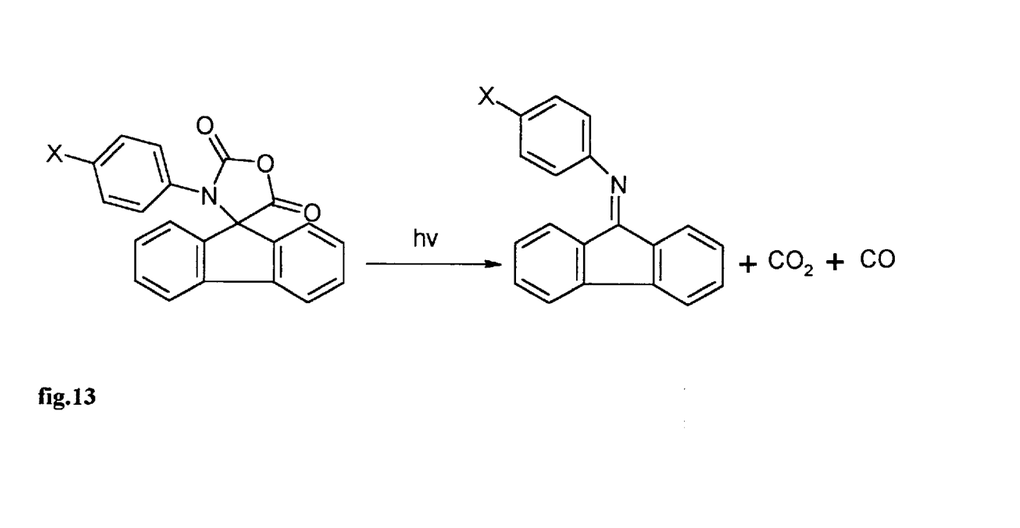
FIG. 13 shows the reaction of photochemical dissociation of the Azasuccinic anhydrides derivatives (photocleavage mechanism).
Figure 14:
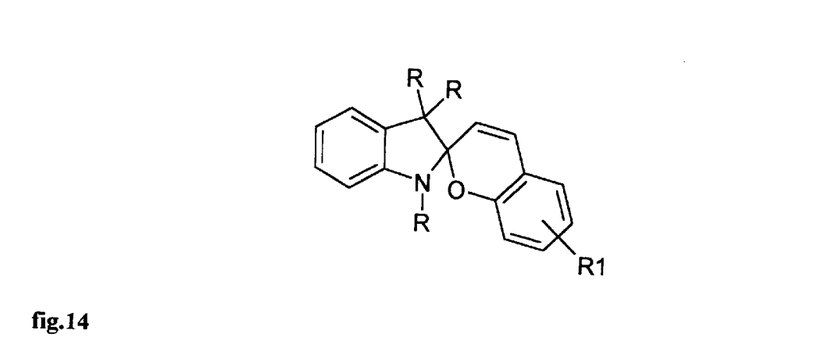
FIG. 14 shows the chemical formula of spiropyrans suitable for use in the present invention.
Figure 15:
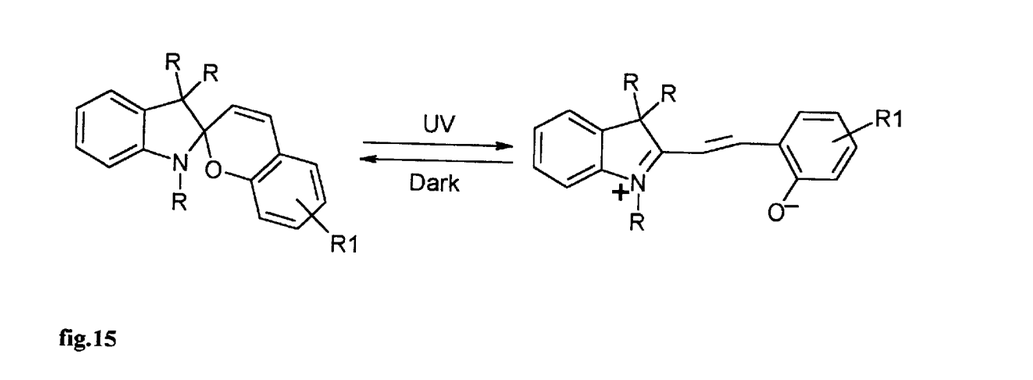
FIG. 15 shows the chemical reaction governed by the ion mechanism responsible for change of color in spiropyrans.
Figure 16:
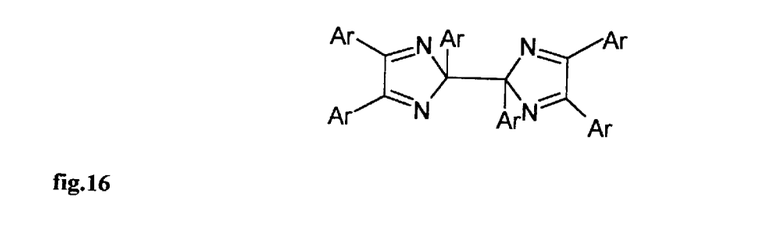
FIG. 16 shows the chemical formula of bisImidazole derivatives suitable for use in the present invention.
Figure 17:
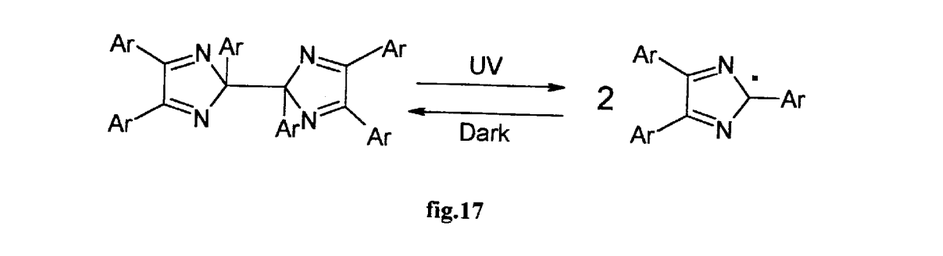
FIG. 17 shows the chemical reaction governed by the mechanism of radical dissociation.

This group of compounds is represented by the general formula shown in FIG. 7. In the above formula $R_1$ and/or $R_2$ represent an aromatic group, for example phenyl or pyridyl while $R_3$ represents the p-substituent in the phenyl ring. Examples of this substituent may include nitro group, cyano group, carboalkoxy group, carbamyl group and carboxy group as shown in FIG. 8. Presented with reference to FIG. 9 is an example of the tautomer hydrogen transfer mechanism. This example refers to the photoinduced isomerization of 2(2',4'-dinitrobenzyl)pyridine.

b) 2,3,4,4-tetrachloro-1-oxo-1,4-dihydronaphthalene, designated as TKN, as described for example in Zweegers, F. P.; Varma, C. A. *J. Phys. Chem.*, 83, 1821 (1979). This compound is represented by the formula shown in FIG. 10 and with reference to FIG. 11, the radical dissociation mechanism is presented.

c) Azasuccinic anhydrides derivatives for example as described in Henderson, W. A.; Zweig, A. *Tetrahedron.*, 27, 5307 (1971). This group of compounds is represented by the general formula shown in FIG. 12. In the above formula X represents an alkoxy group,an amino group, a nitro group, an alkyl group or a halogen. Presented with reference to FIG. 13, is the photocleavage mechanism giving the corresponding imine.

d) Spiropyran derivatives represented by the general formula shown in FIG. 14. In the above formula R and/or $R_1$ represent an alkyl group, a nitro group or a halogen. For example as described in Berman, E.; Fox, R. *J. Am. Chem. Soc*, 81, 5605 (1959). The chemical reaction governed by the formation of ions is presented with reference to FIG. 15.

e) BisImidazoles derivatives for example as described in White, D. M.; Sonnenberg, J. *J. Org. Cherm.*, 29, 1926 (1964). This group of compounds is represented by the general formula shown in FIG. 16. In the above formula Ar represents a phenyl group, a methylphenyl group, a methoxy phenyl group or chlorine phenyl group. Presented with reference to FIG. 17 is the mechanism of radical dissociation.

The present invention will now be disclosed with reference to non limiting examples 1–3 below.

EXAMPLE NO. 1

The dosimeter is designed for skin type No. 2 and has a total thickness of 1 mm. The matrix is manufactured in the form of a film by casting from the polymer solution. The lower layer of the matrix is made of silicone rubber and has thickness 0.5 mm. Distributed within this layer is 4 weight percent of an active photochromic material, 2-(2',4'-dinitrobenzyl)pyridine. The upper layer of the matrix has a maximum thickness of 0.5 mm and is made of PMMA. Distributed within this upper layer is 3 weight percent of a UV absorber, 2,2'-dihydroxy-4-methoxybenzophenone. The dosimeter according to this example refers to an embodiment shown in FIG. 5c with an upper layer having gradient of thickness. The upper layer with the UV absorber is cast separately and then attached to the matrix.

The dosimeter changes color from transparent to blue after irradiation of 1 MED.

The dosimeter was irradiated by the sun during different day hours and during different seasons. The tests were calibrated by a PMA2100 data logger with a PMA2101 UVB detector manufactured by the Solar Light Co. The dosimeter's color is not influenced neither after having light being held on it without time limitation or being held in darkness for at least 4 hours, nor at the temperature 50 deg.C.

EXAMPLE NO. 2

The dosimeter is designed for skin type No. 2 and comprises a matrix made of PMMA. The total thickness of the dosimeter is 1 mm. The matrix in the form of a film is cast from the polymer solution. The lower layer of the matrix has a thickness of 0.5 mm and contains 4 weight percent of an active compound which is 2,2'-di-p-Tolyl-,4,4',5,5'-tetraphenyl. The upper layer has a thickness of 0.5 mm and distributed therein is 10 weight percent of a UV absorber, which is 2,2'-dihydroxy-4-methoxybenzophenone. The dosimeter according to this example refers to an embodiment shown in FIG. 5c with an upper layer having a gradient of thickness. The upper layer is cast separately and then attached to the matrix. The dosimeter changes color from almost transparent with a bit of yellowish to purple after irradiation of 1 MED.

The dosimeter was irradiated by the sun during different hours of the day and during different seasons. The tests were calibrated by a PMA 2100 data logger with a PMA2101 UVB detector manufactured by Solar Light Co. The dosimeter's color is not influenced neither after having light being held on it without time limitation or being held in darkness for at least 4 hours, nor at the temperature 50 deg.C.

EXAMPLE NO. 3

The dosimeter is designed for skin type No. 3 and has the total thickness 2.5 mm. The matrix in the form of a film is cast from the polymer solution. The lower layer of the matrix is made of PVA and contains 5 weight percent of an active compound which is 3,3'-Dinitro-4,4'-di(2-pyridylmethyl) azoxybenzene. The upper layer with an absorber therein is made of PMMA It has a maximum thickness of 0.5 mm and distributed therein is 5 weight percent of a UV absorber, 2-(2-hydroxy-5-methyl-phenyl)-2H-benzotriazole. The dosimeter according to this example refers to an embodiment shown in FIG. 5b with an upper layer having a gradient of thickness. This layer is cast separately and then is attached to the matrix.

The dosimeter changes its color from pale green to blue after irradiation of 1 MED.

The dosimeter was irradiated by the sun during different hours of the day and during different seasons. The tests were calibrated by a PMA2100 data logger with a PMA2101 UVB detector manufactured by the Solar Light Co. The dosimeter's color is not influenced neither after having light being held on it without time limitation or being held in darkness for at least 4 hours, nor at the temperature 50 deg.C.

It should be appreciated that the present invention is not limited to the above-described embodiments and that changes and modifications can be made by one ordinarily skilled in the art without deviation from the scope of the invention, as will be defined in the appended claims.

The dosimeter of the present invention can be used for measuring the UV dose to which not only people but also to which other objects were exposed, for example, plants or animals in agriculture, various sensible equipment to be exploited at the conditions of exposure to UV radiation, etc.

It should be appreciated that the features disclosed in the foregoing description, and/or in the following claims, and/or in the accompanying drawings and/or in the accompanying examples may, both separately and in any combination thereof, be material for realizing the present invention in diverse forms thereof.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A disposable dosimeter for sun radiation comprising a matrix having at least one active chemical compound and a color enhancing agent distributed therein, said active chemical compound, when exposed to UV radiation at a dosage of at least 1 MED, irreversibly changes color, whereas said color enhancing agent is an organic pigment and said color enhancing agent increases and retains the contrast of the color change of said active chemical compound up to 50° C.

2. The disposable dosimeter of claim 1, wherein said active chemical compound is selected from the group consisting of aromatic o-nitro derivatives, spiropyrans derivatives excluding derivatives of naphtospiropyranes, bisimidazoles derivatives and bis-pyrroles derivatives.

3. The disposable dosimeter of claim 1, wherein said organic pigment is selected from a group consisting of derivatives of phyalocyaninie, quinacridone, isoindolinone, perylene, anthraquinone, thioxanthone or a combination thereof.

4. The disposable dosimeter of claim 1, wherein said active chemical compound original color is irreversibly changed to a new color by exposure of said active chemical compound to UV radiation.

5. The disposable dosimeter of claim 4, wherein said chemical reaction may occur by one of the following mechanisms: tautomer hydrogen transfer, radical dissociation, photo cleavage or formation of ions.

6. The dosimeter as defined in claim 5, in which said active chemical compound is at least one compound chosen from the group comprising aromatic o-Nitro derivatives, spiropyrans derivatives, 2,3,4,4-tetrachloro-1-oxo-1,4-dihydronaphthalen derivatives, Bis-Imidazoles derivatives, bis-pyrroles derivatives, or Azasuccinic anhydrides derivatives.

7. The disposable dosimeter of claim 1, wherein said matrix further includes a UV absorbing agent.

8. The disposable dosimeter of claim 7, wherein said absorbing agent is selected from the group consisting of 2,4-bis(2,4-dimethylphenyl)-6-(2-hydroxy-4-n-octyloxyphenyl)-1,3,5-triazine, 2-hydroxy-4(N-octoxy)benzophenone, 2-(2-hydroxy-5-methylphenyl)-2H-benzotriazole, 2-(2H-benzotriazol-2-YL)-4,6-ditertpentylphenol, and 2,2'-dihydroxy-4-methoxybenzophenone taken alone or in combination thereof.

9. The disposable dosimeter of claim 7, wherein said active chemical compound, said color enhancing agent and said absorbing agent are homogeneously distributed within said matrix.

10. The disposable dosimeter of claim 7 wherein said absorbing compound is distributed within the matrix in such a manner so, as to create therein an effective gradient of concentration of the absorbing compound, said gradient being directed from one lateral side of the dosimeter to the opposite lateral side thereof.

11. The disposable dosimeter of claim 7, in which said active chemical compound is distributed within the matrix in such a manner that there is created an effective gradient of concentration of said active compound, said gradient being opposite to the gradient of concentration of said absorbing material.

12. The disposable dosimeter as defined in claim 7, wherein said active chemical compound is homogeneously distributed in the lower portion of said matrix and said absorbing compound is distributed within the upper portion of said matrix.

13. The disposable dosimeter of claim 1 wherein said matrix is formed as a thin layer having a thickness of 0.1–2.5 mm, and having said active chemical compound present in the amount of 0.5–20 weight percent therein.

14. The disposable dosimeter of claim 13 in which said matrix includes a removable opaque covering layer for preventing the premature exposure of said active chemical compound to UV radiation before the dosimeter is in use.

15. The disposable dosimeter of claim 14, wherein said matrix is a solid transparent polymeric layer.

16. The disposable dosimeter of claim 14, wherein said matrix includes a means for attaching the dosimeter to a user's clothing or equipment.

17. A dosimeter as defined in claim 16, which is formed as a disposable sticker, badge or the like.

18. A dosimeter as defined in claim 17, which is attachable to a user's clothing or equipment.

19. The disposable dosimeter of claim 1, wherein said matrix is a solid transparent polymeric layer.

20. The disposable dosimeter of claim 19 wherein said matrix transparent polymeric material is selected from the group consisting of polycarbonates, polystyrenes, polyolefines, polyacrylates, polyvinyl derivatives, polyester derivatives, polyvinyl chloride, cellulose derivatives, polyurethane, polyethylene terephthalate, silicone resins, triethylene glycol dimethacrylate, epoxy resins, taken alone or in combination thereof.

21. The disposable dosimeter of claim 19, wherein said matrix is formed by molding or casting.

22. The disposable dosimeter of claim 19, further including an adhesive layer secured to the bottom surface of said matrix layer for removable attachment to the user's clothing or skin.

23. The disposable dosimeter of claim 22, further including a opaque foil removably secured to said upper surface of said matrix layer to prevent premature exposure of said active compound before use.

* * * * *